United States Patent [19]
Shirakawa et al.

[11] Patent Number: 4,976,973
[45] Date of Patent: Dec. 11, 1990

[54] PROCESS FOR PRODUCING PROTEIN-RICH FISH MEAL AND FISH OIL

[75] Inventors: Yoichi Shirakawa, Urawa; Yoshio Minowa, Ryugasaki; Takayoshi Azumi, Ohmiya; Junichi Hisano, Urawa, all of Japan

[73] Assignee: Asahi Denka Kogyo K.K., Tokyo, Japan

[21] Appl. No.: 207,270

[22] Filed: Sep. 28, 1990

[30] Foreign Application Priority Data

Jul. 27, 1987 [JP] Japan .................. 62-187264
Jul. 27, 1987 [JP] Japan .................. 62-187265
Jul. 27, 1987 [JP] Japan .................. 62-187266

[51] Int. Cl.$^5$ ...................... A23J 1/04; A23L 1/325
[52] U.S. Cl. ........................................ 426/7; 426/56; 426/643; 426/657; 426/480; 426/489; 426/495
[58] Field of Search ............... 426/56, 55, 59, 62, 426/2, 7, 643, 656, 657, 480, 489, 495

[56] References Cited

U.S. PATENT DOCUMENTS 4,335,146  6/1982  Bladh.
4,405,649  9/1983  Jeffreys et al..
4,861,602  8/1989  Uchida et al. ..................... 426/56

Primary Examiner—Marianne Cintins
Attorney, Agent, or Firm—Flynn, Thiel, Boutell & Tanis

[57] ABSTRACT

A process for producing a protein-rich fish meal and a fish oil which comprises treating fish bodies with a protease acting at a relatively low temperature to give a slurry and dividing and drying said slurry at a relatively low temperature. The products thus obtained scarcely undergo thermal denaturation and contain a large amount of partially decomposed protein. Thus they are highly useful as a protein source for, e.g., feeds, baits and pet foods.

10 Claims, No Drawings

PROCESS FOR PRODUCING PROTEIN-RICH FISH MEAL AND FISH OIL

BACKGROUND OF THE INVENTION

Field of the Invention

This invention relates to a process for producing a fish meal and a fish oil. More particularly, it relates to a process for producing a fish meal and a fish oil that scarcely undergoing thermal denaturation, which comprises treating fish bodies with a protease at a relatively low temperature and dividing and drying the treated matters each at a relatively low temperature.

This invention further relates to a process for producing a protein-rich fish meal suitable as a protein source for, e.g., feeds, baits and pet foods. More particularly, it relates to a process for producing a fish meal which contains a small amount of ash as well as a large amount of partially decomposed and scarcely denatured crude protein.

Fish meal and fish oil have been produced from fish bodies and processing residue thereof by optionally pretreating, for example, cutting, crushing or grinding the raw material; boiling the treated material; pressing the same to thereby separate liquid matters containing a fish oil; drying the residual solid matters optionally together with fish-solubles, which will be described hereinafter; grinding the material, if required, to thereby give a fish meal; while separating the fish oil from the liquid matters; and concentrating the residual liquid matters to thereby give fish-solubles.

Since the abovementioned process involves high temperature heating processe(es) such as boiling, proteins contained in the fish meal thus obtained are thermally denatured ones, which makes the product not always satisfactory as a proteinaceous feed in some cases.

In addition, the fish oil produced by the above process is also a thermally denatured one. Thus it is difficult to obtain a fish oil of excellent qualities thereby.

An example of known methods for producing a crude protein-rich fish meal comprises employing white-meat fish rich in crude protein as the starting material. However this method cannot be widely employed since the material sources are limited and the materials are generally expensive. In order to overcome these problems, Japanese Patent Laid-Open No. 156370/1985 has proposed a process wherein a conventional fish meal is divided into a portion rich in fish bones (i.e., ash) and another portion containing a small amount of the same. However the fish bone-rich portion as obtained by the above process still contains a significantly large amount of protein. Thus this process is unsatisfactory from the viewpoint of the effective utilization of protein.

A conventional process for producing a fish meal involves high-temperature heating step(s) such as boiling. Thus the obtained fish meal is a thermally denatured one, which sometimes makes it unsatisfactory as a protein source for feeds, baits or pet foods.

SUMMARY OF THE INVENTION

The present inventors have conducted studies on a process comprising treating a fish material under such conditions as to cause little thermal denaturation to thereby collect fish protein in the form of a fish meal or fish oil similar to those obtained by a conventional method. As a result, they have unexpectedly found that a slurry can be obtained at an early stage by treating fish bodies with a protease acting at a relatively low temperature and that the obtained slurry can be divided into a cake, a heavy liquor and a light liquor in a three-phase decanter, thus completing the present invention.

The present inventors have conducted various studies in order to establish a process for producing a crude protein-rich fish meal under such conditions as to cause little thermal denaturation. As a result, they have unexpectedly found that fish meat can be readily removed from fish bones at an early stage by treating fish bodies with a protease acting at a relatively low temperature to thereby give a slurry; that fish bones almost free from fish meat can be obtained by sieving said slurry; and that the slurry free from the fish bones can be readily divided into solid and liquid matters by using a continuous decanter, thus completing the present invention.

Accordingly the process for producing a fish meal and a fish oil of the present invention comprises treating fish bodies, which have been optionally cut, with a protease acting at a relatively low temperature to thereby give a slurry; dividing said slurry into a cake, a heavy liquor and a light liquor by using a three-phase decanter; concentrating the obtained heavy liquor; combining the concentrate thus obtained with the abovementioned cake; drying the resulting mixture to thereby give a fish meal; while separating an oil from the abovementioned light liquor to thereby give a fish oil.

Further the process for producing a crude protein-rich fish meal of the present invention comprises treating fish bodies, which have been optionally cut, with a protease acting at a relatively low temperature to thereby give a slurry; sieving said slurry to thereby remove fish bones; dividing the slurry free from the fish bones into solid and liquid matters by using a continuous decanter; drying the solid matters optionally together with fish-solubles, which are prepared by continuously centrifuging the above-mentioned liquid matters and concentrating the stick water thus obtained, to thereby give a crude protein-rich fish meal.

DETAILED DESCRIPTION OF THE INVENTION

Now the process for producing a fish meal and a fish oil which have scarcely undergone thermal denaturation from, for example, fish bodies according to the present invention will be described in detail.

Examples of the fish bodies to be used as the starting material in the process of the present invention include fish which are caught in large quantities, such as herring, sardine, mackerel, saury, round herring, Alaska pollack, flatfish, anchovy and pilchard In order to produce a fish meal and a fish oil of excellent qualities, it is desirable to employ fresh fish(es).

Examples of the protease to be used in the present invention include proteinases such as acrosin, urokinase, uropepsin, elastase, enteropeptidase, cathepsin, kallikrein, kininase 2, chymotrypsin, chymopapain, collagenase, streptokinase, subtilisin, thermolysin, trypsin, thrombin, papain, pancreatopeptidase and rennin; peptidases such as aminopeptidases, for example, arginine aminopeptidase, oxytocinase and leucine aminopeptidase; angiotensinase, angiotensin converting enzyme, insulinase, carboxypeptidase, for example, arginine carboxypeptidase, kininase 1 and thyroid peptidase, dipeptidases, for example, carnosinase and prolinase and pronases; as well as other proteases, denatured products thereof and compositions thereof. These proteases may be classified into exopeptidases acting from the end of a polypeptide chain and endopeptidases acting inside thereof depending on the mode of their actions, and the latter is preferable.

Now a preferable embodiment of the process for producing a fish meal and a fish oil according to the present invention will be described in detail.

First, the starting material, i.e., fish bodies, which have been optionally cut, is treated with a protease in a continuous or batch-wise reactor provided with a stirrer at 30 to 80° C., preferably at 45 to 75° C., for 30 minutes to one hour, preferably for 40 to 50 minutes, under stirring. At this step, 0.001 to 1.0% by weight, based on the material to be treated, of the enzyme is used.

The slurry thus obtained is supplied to a continuous three-phase decanter to thereby divide the same into a cake, a heavy liquor and a light liquor mostly comprising fish oil. Then the heavy liquor is concentrated at a temperature below 80° C., preferably below 75° C., and the resulting concentrate is combined with the above-mentioned cake. Then the mixture is fed into a dryer and dried therein at a temperature below 80° C., preferably below 75° C. and then ground, if required, to thereby give a fish meal. Separately, the light liquor is continuously centrifuged to thereby separate the fish oil therefrom.

The stirring in the continuous or batch-wise reactor provided with a stirrer, as described above, may be effected in such a manner as to sufficiently contact the fish bodies with the enzyme. When a continuous reactor is to be used, it is preferable that the slurry is in the form of an extruded flow. In order to achieve such a treatment, for example, a horizontal reactor may be employed. When a batch-wise reactor is to be used, on the other hand, either a conventional tank-type reactor or a horizontal one may be used.

In the production of a fish meal and a fish oil, a screw press is commonly employed for the separation of solid and liquid matters. However this procedure cannot be employed unless protein is coagulated by heating, for example, boiling. Thus this procedure, which is accompanied by the leakage of a large amount of solid matters into the liquid portion, cannot be employed in the process of the present invention. The present inventors have examined various procedures for achieving the separation and consequently found that the use of a continuous three-phase decanter is highly effective therefor.

Examples of available continuous three-phase decanter include those of KVZ-T series (mfd. by Mitsubishi Kakoki Kaisha, Ltd.).

The heavy liquor is concentrated in order to improve the state of mixing of the same with the cake and to lower the production cost. Namely, when the heavy liquor as such is combined with the cake, the cake forms a slurry, which makes the subsequent drying difficult. From the viewpoint of heat efficiency, too, concentrating the heavy liquor in a concentrating drum is preferred to evaporating the moisture in a dryer. The concentration should be carried out to such an extent that the resulting concentrate is sufficiently flowable, namely, to adjust the moisture content of the concentrate to approximately 70%.

The fish meal as produced by the process of the present invention scarcely undergoes thermal denaturation, since the process involves no high-temperature heating step such as boiling. Further the protein contained therein is partially decomposed, which promotes the absorption and digestion thereof. Thus this fish meal is highly desirable as a protein source for, e.g., fish feeds and pet foods.

The fish oil as produced by the process of the present invention contains valuable trace components which have not been thermally denatured. In addition, it may be used as an excellent edible oil by treating in a conventional manner, e.g., refining, deodorizing or hydrogenating.

According to the process of the present invention, a fish meal and a fish oil, which are superior to conventional ones in qualities, can be produced at a yield comparable to those of conventional processes.

Fish meal has been employed as the main protein source of, for example, feeds, baits and pet foods. A crude protein-rich fish meal is particularly requisite for, e.g., fry feeds in order to elevate the feed efficiency. The fish meal as produced by the process of the present invention is advantageous not only in that it is rich in crude protein but also in that the protein contained therein is scarcely denatured but is partially decomposed and thus highly digestible and absorbable, since the process of the present invention involves no high-temperature heating step such as boiling. Thus the fish meal is very excellent as a protein source for, e.g., feeds, baits and pet foods.

Now an embodiment of the process for producing a crude protein-rich fish meal according to the present invention will be described in detail.

First, fish bodies, which have been optionally cut, are treated with a protease in a reactor provided with a stirrer at a temperature of 30 to 80° C., preferably at 45 to 75° C., for 30 minutes to one hour, preferably for 40 to 50 minutes, under stirring.

At this step, the enzyme is employed in an amount of 0.001 to 1.0% by weight based on the material to be treated.

The slurry thus obtained is passed through a 1 to 30 mm-mesh, preferably 5 to 15 mm-mesh sieve to thereby remove fish bones therefrom. It is preferable to pass the slurry through the sieve together with a small amount of water to thereby promote the removal of fish meat from fish bones, thus improving the yield After removing the fish bones, the slurry is fed into a continuous decanter and thus divided into solid and liquid matters. The solid matters are fed into a dryer optionally together with fish-solubles, which are obtained by continuously centrifuging the liquid matters as obtained above to remove stick water and then concentrating the stick water at a temperature below 80° C. preferably below 75° C., and then dried therein at a temperature below 80° C., preferably below 75° C. The dried product may be ground, if required, to thereby give a fish meal.

In the production of fish meals, screw pressing is commonly employed for the separation of solid and liquid matters. However, this procedure cannot be employed unless protein is coagulated by heating, for example, boiling. This procedure, which is accompanied by the leakage of a large amount of solid matters into the liquid portion, cannot be employed in the process of the present invention. The present inventors have examined various procedures for achieving the separation and consequently found that the use of a continuous decanter is highly effective therefor.

Examples of the continuous decanter include three-phase decanters such as those belonging to KVZ-T series (mfd by Mitsubishi Kakoki Kaisha, Ltd.) and two-phase decanters such as those belonging to Shear Press Super Decanter P series (mfd. by Tomoe Kogyo K.K.).

Among various continuous centrifuges on the market, Self-jector (mfd. by Mitsubishi Kakoki Kaisha, Ltd) and disc-type Centrifuge CHPX series (mfd. by Nagase-Alpha K.K.) may be cited as examples

EXAMPLES

To further illustrate the present invention, and not by way of limitation, the following Examples will be given.

Example 1

300 kg of sardine pieces (15 mm) and 15 g of Protease Amano A (mfd by Amano Pharmaceutical Co., Ltd.), which had been preliminarily dissolved in 1 l of water, were introduced into a 500-l kneader-type reactor. The resulting mixture was heated to 50 to 55° C. and maintained at this temperature for 20 minutes under stirring. Then it was further heated to 70 to 75° C. and maintained at this temperature for 20 minutes to thereby inactivate the enzyme. The slurry thus obtained was fed into a continuous three-phase decanter to thereby divide the same into a cake, a heavy liquor and a light liquor. The ratio by weight of the cake, heavy liquor and light liquor thus obtained was 45 : 40 : 15. The moisture content of the heavy liquor was 80% by weight. This heavy liquor was concentrated in a concentrating drum to give a moisture content of 70% and then combined with the abovementioned cake. The mixture thus obtained was fed into a dryer and dried therein at 70 to 75° C. Thus 65.1 kg of a fish meal of a moisture content of 8.0% was obtained. The yield of the fish meal based on the starting fish was 21.7%, which was comparable to those achieved by conventional methods.

Table 1-a shows the analytical data of the fish meal thus obtained as well as that of a conventional one for reference.

TABLE 1-a

|  | Fish meal produced by the invention process (%) | Reference (%) |
| --- | --- | --- |
| Moisture | 8.0 | 7.8 |
| Crude protein | 68.2 | 68.3 |
| Crude fat | 9.8 | 9.6 |
| Ash | 14.0 | 14.3 |

Separately the light liquor as obtained above was continuously centrifuged to thereby separate an oil. Thus 25.2 kg of a fish oil was obtained. The yield of the fish oil based on the starting fish was 8.5%, which was comparable to those achieved by conventional methods, taking the crude fat content of the starting fish (12.0%) and that contained in the fish meal into consideration.

Table 1-b shows the analytical data of the fish meal thus obtained as well as that of a conventional one for reference.

TABLE 1-b

|  | Fish oil produced by the invention process | Reference |
| --- | --- | --- |
| AV (mg KOH/g) | 2.3 | 5.0 |
| IV | 176.2 | 173.1 |
| POV (meq/kg) | 5 | 8 |

Example 2

The procedures of Example 1 were repeated except that a continuous reactor was employed. Namely, a horizontal reactor provided with a stirrer wherein fish bodies were stirred in the form of a piston flowwas used. Further the reaction mixture was heated in a heating zone and the reaction time as defined in Example 1 was regarded as the residence time. The enzyme was dissolved in water and continuously added to the reactor at the same ratio as the one specified in Example 1.

Starting fish comprising approximately 5% of mackerel and the balance of sardines were cut into pieces of 25 mm and treated at a rate of 5 t/hr for 20 hours.

As a result, 22.0 t of a fish meal of a moisture content of 7.6% and 10.0 t of a fish oil were obtained. The yields of these products based on the starting fishes were 22.0% and 10.0%, respectively, each comparable to those achieved by conventional methods. Table 2-a shows the analytical data of the fish meal thus obtained and those of a conventional one for reference.

TABLE 2-a

|  | Fish meal produced by the invention process (%) | Reference (%) |
| --- | --- | --- |
| Moisture | 7.6 | 7.8 |
| Crude protein | 68.4 | 68.3 |
| Crude fat | 10.0 | 9.6 |
| Ash | 14.0 | 14.3 |

Table 2-b shows the analytical data of the fish oil as obtained above and those of a conventional one for reference.

TABLE 2-b

|  | Fish oil produced by the invention process (%) | Reference (%) |
| --- | --- | --- |
| AV (mg KOH/g) | 2.5 | 5.0 |
| IV | 176.0 | 173.1 |
| POV (meq/kg) | 5 | 8 |

Example 3

4 t of sardines and 200 g of Protease Amano A (mfd. by Amano Pharmaceutical Co., Ltd.), which had been dissolved in a small amount of water, were introduced into a 5-m$^3$ reactor provided with a stirrer. The resulting mixture was heated to 50 to 55° C. and maintained at this temperature for 20 minutes under stirring. Then it was further heated to 70 to 75° C. and maintained at this temperature for 20 minutes to thereby inactivate the enzyme. The slurry thus obtained was passed through a 10 mm-mesh sieve to thereby remove fish bones therefrom. After removing the fish bones, the slurry was fed into a continuous decanter and thus divided into solid and liquid matters. The solid matters were dried in a drier at 70 to 75° C. to thereby give 660 kg of a fish meal. The yield of this fish meal based on the starting fish was 16.5%.

Table 3 shows the analytical data of the fish meal thus obtained and those of a conventional one for reference.

TABLE 3

|              | Fish meal produced by the invention process (%) | Reference (%) |
|--------------|-------------------------------------------------|---------------|
| Moisture     | 7.9                                             | 7.8           |
| Crude protein| 73.1                                            | 68.3          |
| Crude fat    | 8.9                                             | 9.6           |
| Ash          | 10.1                                            | 14.3          |

Example 4

The procedures of Example 3 were repeated until the step of dividing the slurry into solid and liquid matters. Subsequently the liquid matters were continuously centrifuged to give stick water which was then concentrated at a temperature below 75° C. to thereby give fish-solubles. The fish-solubles thus obtained were combined with the solid matters obtained above and dried in a drier at 70 to 75° C. Thus 720 kg of a fish meal was obtained. The yield of the fish meal based on the starting fish was 18.0%.

Table 4 shows the analytical data of the fish meal as obtained above and those of a conventional one for reference.

TABLE 4

|              | Fish meal produced by the invention process (%) | Reference (%) |
|--------------|-------------------------------------------------|---------------|
| Moisture     | 8.0                                             | 7.8           |
| Crude protein| 73.3                                            | 68.3          |
| Crude fat    | 9.6                                             | 9.6           |
| Ash          | 9.2                                             | 14.3          |

What is claimed is:

1. A process for producing fish meal, which comprises: in a reactor, at a temperature of from 30 to 80° C., stirring a protease with raw fish bodies or pieces thereof, under conditions effective to remove fish meat from fish bones and form a slurry of solid, fish particles dispersed in a liquid; removing the liquid from the solid, fish particles in a continuous, three-phase decanter so as separately to obtain a first cake of solid, fish particles, a heavier liquid phase and a light liquid phase; and then drying said first cake to obtain a fish meal.

2. A process as claimed in claim 1 in which said protease is stirred with comminuted raw fish pieces.

3. A process as claimed in claim 1 which comprises centrifuging said heavier liquid phase to separate a second cake therefrom, and incorporating said second cake into said first cake of solid, fish particles before said drying step.

4. A process as claimed in claim 1, which comprises treating said lighter liquid phase and recovering fish oil therefrom.

5. A process as claimed in claim 3, which comprises treating said lighter liquid phase and recovering fish oil therefrom.

6. A process as claimed in claim 1 in which the amount of said protease is from 0.001 to 1.0% by weight, based on the weight of said raw fish bodies or pieces thereof, and wherein said stirring is carried out for from 30 minutes to one hour.

7. A process for producing fish oil, which comprises: in a reactor, at a temperature of from 30 to 80° C., stirring a protease with raw fish bodies or pieces thereof, under conditions effective to remove fish meat from fish bones and form a slurry of solid fish particles dispersed in a liquid; in a continuous three-phase decanter, separating said slurry into a first cake of solid, fish particles, a heavier liquid phase and a lighter liquid phase containing fish oil; and recovering said fish oil from said lighter liquid phase.

8. A process as claimed in claim 7 in which said protease is stirred with comminuted raw fish pieces.

9. A process as claimed in claim 7 in which, prior to said separating step, said slurry is filtered to remove said fish bones from said slurry.

10. A process as claimed in claim 7 in which the amount of said protease is from 0.001 to 1.0% by weight, based on the weight of said raw fish bodies or pieces thereof, and wherein said stirring is carried out from 30 minutes to one hour.

* * * * *

UNITED STATES PATENT AND TRADEMARK OFFICE
CERTIFICATE OF CORRECTION

PATENT NO. : 4,976,973
DATED : December 11, 1990
INVENTOR(S) : Yoichi SHIRAKAWA et al It is certified that error appears in the above-identified patent and that said Letters Patent is hereby corrected as shown below:

On the title page, item [22], change the date to read as follows ---June 15, 1988---.

Column 8, line 1; change "light" to ---lighter---.

Column 8, line 41; before "from" insert ---for---.

Signed and Sealed this

Fourth Day of August, 1992

Attest:

DOUGLAS B. COMER

*Attesting Officer*  *Acting Commissioner of Patents and Trademarks*